United States Patent [19]

Sugimori et al.

[11] Patent Number: 5,343,122

[45] Date of Patent: * Aug. 30, 1994

[54] LUMINAIRE USING INCANDESCENT LAMP AS LUMINOUS SOURCE

[75] Inventors: Hideo Sugimori, Kyoto; Kazumi Masaki, Osaka; Osamu Matsuda, Okayama, all of Japan

[73] Assignee: Ken Hayashibara, Okayama, Japan

[ * ] Notice: The portion of the term of this patent subsequent to Jun. 30, 2009 has been disclaimed.

[21] Appl. No.: 743,066

[22] Filed: Aug. 9, 1991

Related U.S. Application Data

[63] Continuation-in-part of Ser. No. 557,043, Jul. 25, 1990, Pat. No. 5,126,636.

[51] Int. Cl.$^5$ .......................................... H05B 39/04
[52] U.S. Cl. ................ 315/209 R; 315/219; 315/291; 315/307
[58] Field of Search .............. 315/200 R, 206, 209 R, 315/219, 225, 291, 307

[56] References Cited

U.S. PATENT DOCUMENTS

| 4,959,755 | 9/1990 | Hochstein | 315/291 X |
| 5,126,636 | 6/1992 | Masaki | 315/291 |
| 5,214,353 | 5/1993 | Nilssen | 315/33 |

FOREIGN PATENT DOCUMENTS

0072599  3/1990  Japan .

*Primary Examiner*—David Mis
*Attorney, Agent, or Firm*—Browdy and Neimark

[57] ABSTRACT

Disclosed is a novel luminaire wherein a switching power supply circuitry is used to operate one or more incandescent lamps at a dc voltage exceeding their rating. The luminaire emits a flickerless light with a color temperature of about 2,900 K. or higher which is natural, closer to sunlight, superior in color rendering properties, gentle to the eyes, therefore very useful in illumination. The switching power supply circuitry exhibits a high power efficiency and capacity, and the output voltage is easily regulatable to a desired magnitude for lamp dimming.

10 Claims, 4 Drawing Sheets

LUMINAIRE USING INCANDESCENT LAMP AS LUMINOUS SOURCE

This application is a continuation-in-part of U.S. Ser. No. 07/557,043, filed Jul. 25, 1990 and now issued as U.S. Pat. No. 5,126,636, the entire contents of which above-referenced application are incorporated herein by reference.

BACKGROUND OF THE INVENTION

1. Field of the Invention

This invention relates to a luminaire, in particular, a luminaire wherein switching power supply circuitry is used to operate an incandescent lamp at a dc voltage exceeding its rating.

2. Description of the Prior Art

Recently, the number of school children with visual fatigue or pseudomyopia and workers with visual fatigue is steadily increasing. This would be due to long-time TV and fine print watching under inappropriate illumination. Recent tendency prefers luminaires which make a person recognize the color of articles as they really are, and repeated discussions have been focused on color rendering properties of illumination.

Luminous sources which have been extensively used in luminaires are fluorescent and incandescent lamps. Fluorescent lamp has the merit that its relatively high total luminous flux provides a bright illumination, as well as having the demerits that its flicker tends to cause visual fatigue, and that the unbalance between total luminous flux and color temperature deteriorates color rendering properties to make articles look paler than they really are.

Although incandescent lamp is superior to fluorescent lamp because the well balance between total luminous flux and color temperature achieves satisfiable color rendering properties, incandescent lamp has the demerit that it is generally low in total luminous flux and this tends to cause visual fatigue when used in illumination for long time.

Japanese Patent Kokai No. 72,599/90 (Title: "Lighting device") and Japanese Patent Kokai No. 59,994/91 (Title: "Lighting device") disclose that in order to overcome these demerits of conventional luminaires, incandescent lamps are energized with a dc voltage exceeding their rating to obtain a light with a color temperature of about 2,900 K. or higher, desirably, in the range of about 2,950–3,100 K., which is flickerless, natural and gentle to the eyes.

The luminaires disclosed in these Japanese Patent Kokai however have the drawbacks that:

(i) they are not easily applicable in the illumination of facilities because the regulation of their power supply circuitry requires one individual power supply for every incandescent lamp;

(ii) the size-down of their power supply circuitry is limited because they need relatively large-size smoothing capacitors;

(iii) they are susceptible to voltage variation because the regulation of their output voltage is difficult;

(iv) it is difficult to continuously or stepwisely change their output voltage for lamp dimming; and (v) to soft-start an incandescent lamp, one has to provide a relatively large-size overcurrent-limiting resistor in the current path including the incandescent lamp, and this resistor hinders the size-down of the luminaires, as well as generating heat.

SUMMARY OF THE INVENTION

In view of the foregoing, we have made great efforts on the development of luminaires using incandescent lamp as luminous source which are freed of these drawbacks, in particular, those using switching power source circuitry.

As the result, we found that when incandescent lamp is operated with switching power supply circuitry at a dc voltage exceeding its rating, desirably, in the range of about 105–135% thereof, one can obtain a light with a color temperature of about 2,900 K. or higher, desirably, in the range of about 2,950–3,100 K., which is flickerless, natural, superior in color rendering properties and gentle to the eyes.

Furthermore, the luminaire using switching power supply circuitry has the following merits which are never found in conventional luminaires:

(i) the power supply can be easily made smaller because its power efficiency is high;

(ii) two or more incandescent lamps can be easily operated with one power supply circuitry;

(iii) the output voltage can be kept constant even when the input voltage and/or load current varies because the voltage regulation is easily achieved;

(iv) the shortening in service life of incandescent lamp and damage of circuit elements can be effectively prevented because soft-start function can be easily imparted;

(v) lamp dimming can be easily achieved by continuously or stepwisely changing the output voltage; and (vi) the power efficiency does not greatly vary even when the load power changes.

In particular, this invention relates to a luminaire using an incandescent lamp as luminous source, characterized by providing a switching power supply circuitry capable of supplying to an incandescent lamp a dc voltage exceeding its rating so that said incandescent lamp is energized with a dc voltage exceeding its rating to emit a light with a color temperature of about 2,900 K. or higher.

BRIEF EXPLANATION OF THE FIGURES

Throughout the figures, reference numeral 1 designates rectifier and smoothing circuit; 2, line filter; 3, switching element; 4, smoothing circuit; 5, feedback amplifying circuit; 6 and OSC, oscillator circuit; 7 and PWM, pulse-width modulating circuit; Z and Z1–Z3, incandescent lamps; AC, ac source; C1–C12, capacitors; L and L1–L2, inductors; D1–D13, diodes; R1–R15, resistors; Th and Th1–Th2, thyristors; FET, power MOS field-effect transistor; Tr1–Tr3, transistors; REF, standard voltage-generating circuit; IC1–IC3, integrated circuits; PC1-1, light-emitting section of photocoupler; and PC1-2, light-receiving section of photocoupler.

DETAILED DESCRIPTION OF THE INVENTION

The incandescent lamps feasible in this invention are those which comprise a tungsten filament and a trace amount of inert gas enclosed in a vacuum glass bulb, and any such an incandescent lamp can be used in this invention regardless of its rated wattage, rated voltage, efficiency and shape, as long as it emits a continuous light with a color temperature of about 2,900K or higher, desirably, about 2,950-3,100K when energized with a dc voltage exceeding its rating, desirably, in the range of about 105-135% thereof, using the hereinafter mentioned switching power supply circuitry. In view of the color rendering properties of the obtained light, it is desirable to choose an incandescent lamp which gives a total luminous flux of about 900 lumens or higher, desirably, about 1,000-1,400 lumens when operated at such a dc voltage.

Such an incandescent lamp can be chosen among commercialized products with a relatively high rated voltage, in particular, those which are designed to exhibit a rated wattage of 25-150 W, desirably, 40-60 W at standard ac line, or specially designed and prepared to give a desired rated voltage, rated wattage, total luminous flux, efficiency and shape: For example, argon lamps enclosing argon gas alone or in combination with other inert gas such as nitrogen gas, krypton lamps enclosing krypton gas alone or in combination with other inert gas such as nitrogen gas, and xenon lamps enclosing xenon gas alone or in combination with other inert gas such as nitrogen gas, argon gas and krypton gas are all advantageously feasible in this invention.

In case of using argon lamp, for example, "SOFT-WHITE 120 V 60 W", "STANDARD 120 V 60 W" and "INSIDE FROST 130 V 60 W", products of General Electric Co., Connecticut, USA, and "INSIDE FROST 120 V 60 W", a product of N. V. Philips' Gloeilampenfabrieken, Eindoven, the Netherlands, are suitable. These argon lamps can be easily allowed to emit a natural light with a color temperature of about 2,900K or higher, which is superior in color rendering properties and gentle to the eyes, by applying a dc voltage up to about 105% of the rating. Such an overvoltage is within a variation as usually observed in standard ac line, and the shortening in service life due to the overvoltage causes no serious problem in practical use.

Krypton and xenon lamps achieve a much longer service life than argon lamp because krypton and xenon lamps, especially, xenon lamp, easily achieve a prescribed color temperature and total luminous flux even at a relatively low overvoltage.

The wording "switching power supply circuitry" as referred to in this invention means a type of power supply circuitry wherein a switching element, for example, power transistor, power field-effect transistor (FET) and thyristor, is arranged to enable on/off operation against a dc input voltage obtained by rectifying and smoothing an ac, for example, from standard ac line, and also to change the time ratio of the on and off durations to obtain a high-frequency pulsatile voltage which is then subjected, for example, to a rectifying circuit, for example, LC filter, to obtain a dc output voltage exceeding the effective voltage of the ac source used: Any switching power supply circuitry is feasible in this invention, provided that it is capable of supplying to one or more incandescent lamps a dc voltage exceeding their rating while bearing the incandescent lamp(s) at the output terminal.

Particular switching power supply circuitries are, for example, of conventional chopper type such as boost chopper- and buck chopper-types, or of conventional converter type such as forward converter-, flyback converter-, push-pull converter-, half-bridge converter- and full-bridge converter-types: Dependent on the power consumption and number of the incandescent lamps to be used, switching power supply circuitries of chopper- or forward converter-type are suitable for a load up to about 100-200 W; and those of push-pull converter-, half-bridge converter- or full-bridge converter-type are suitable for a higher load.

The switching power supply circuitry feasible in the present invention will hereinafter be explained by taking for example a switching power supply circuitry of forward converter type.

Figure 1:
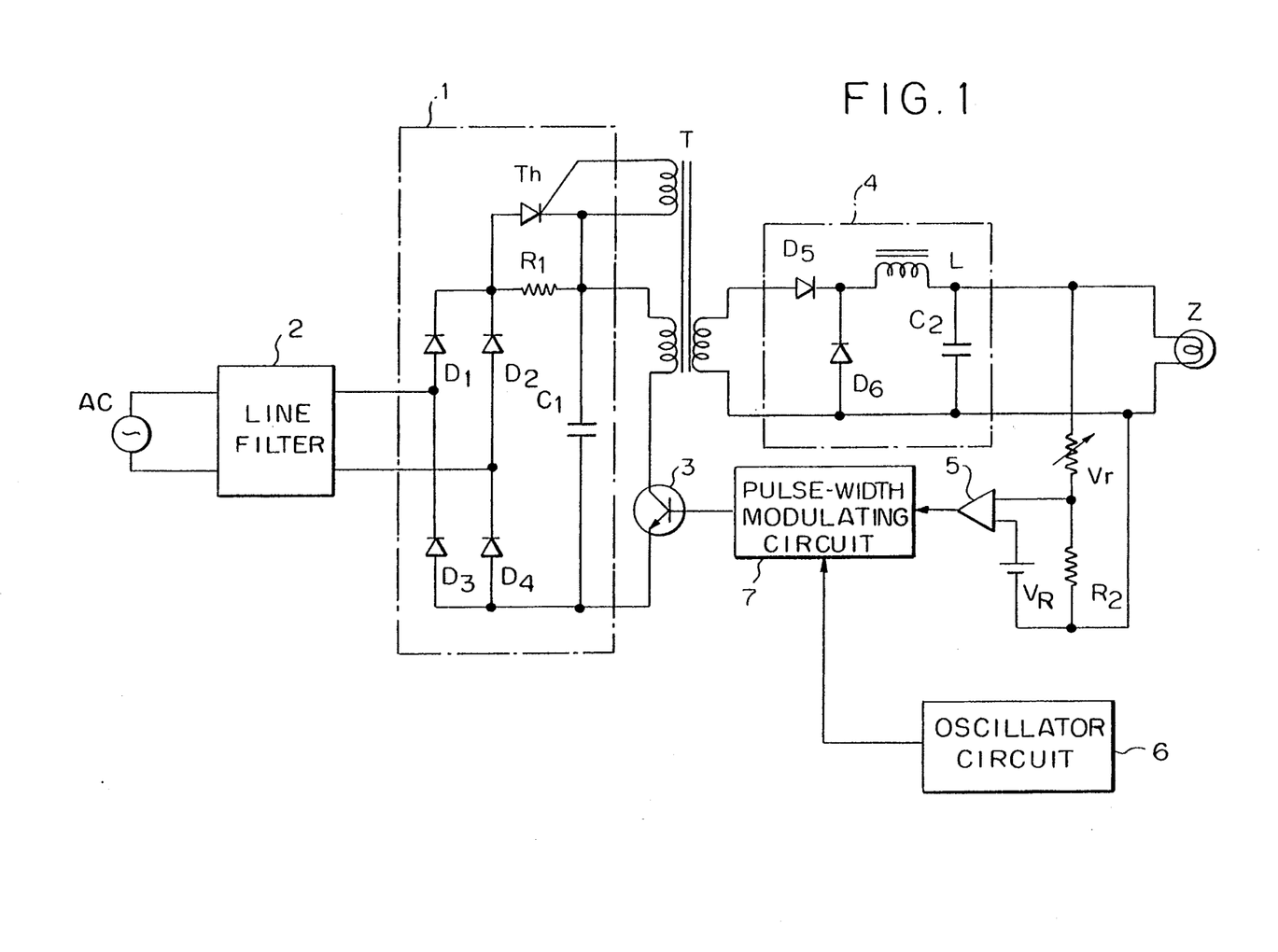
FIG. 1 is a block diagram of a luminaire according to the present invention.

As shown in FIG. 1, switching power supply circuitry is usually provided with a rectifying and smoothing circuit 1 which is to convert an ac from an ac source AC such as standard ac line and bears an input terminal connected with the ac source AC, and in the rectifying and smoothing circuit 1 rectifying diodes D1-D4 as rectifying means and a capacitor C1 as smoothing means are provided. Between the ac source AC and rectifying and smoothing circuit 1, a line filter 2 is inserted in order to shield any external and/or internal noise, if necessary.

The output terminal of the rectifying and smoothing circuit 1 is connected with a switching element 3 which repeats on/off operation at high speed to generate a high-frequency pulsatile voltage, and an output terminal of an inverter transformer T connected with the main current path of the switching element 3 is connected with a smoothing circuit 4 consisting of high-speed diodes D5 and D6 such as first recovery diode, an inductor L and a capacitor C2 to convert the high-frequency pulsatile voltage into dc.

The output terminal of the smoothing circuit 4 is connected with one or more incandescent lamps Z and an output voltage-sensing circuit consisting of a variable resistor Vr and a resistor R2. Across the resistor R2 is connected a feedback amplifying circuit 5, while the output terminal of the feedback amplifying circuit 5 is connected with a control electrode of the switching element 3 through a pulse-width modulation circuit 7 bearing an oscillating circuit 6.

The variable resistor Vr is to suitably control the voltage across the incandescent lamp Z for lamp dimming.

Now explaining the operation of this switching power supply circuitry, the ac voltage from the ac power source AC is converted into dc by the rectifying and smoothing circuit 1. The dc output voltage of the rectifying and smoothing circuit 1 is converted by the switching element 3 repeating on/off operation at high speed into a high-frequency pulsatile voltage which is then smoothed by the smoothing circuit 4 into dc and supplied to the incandescent lamp Z. While the feedback amplifying circuit 5 compares the divided voltage across the resistor R2 in the output voltage-sensing circuit with a standard voltage VR, amplifies the error and supplies it to the pulse-width modulating circuit 7. The pulse-width modulating circuit 7 is capable of supplying a control signal with a desired pulse width to the control electrode of the switching element 3 while synchronizing with the oscillating circuit 6, whereby the pulse-width modulating circuit 7 widens the pulse width of the control signal to be supplied to the switching element 3 if the output voltage of the feedback amplifying circuit 5 is lower than a prescribed magnitude, while the pulse-width modulating circuit 7 reduces the pulse width if the output voltage is higher than the magnitude. Thus, the output voltage is stabilized.

It is said that the service life of incandescent lamps decreases in reverse proportion to about 13th power of the applied voltage, therefore even a slight increase in power supply voltage leads to a remarkable decrease in the service life. Since the switching power supply circuitry used in this invention provides a stabilized output voltage with ease, it can consistently supply to incandescent lamp a stabilized dc voltage exceeding its rating, desirably, in the range of about 105–135% thereof even when the ac power source AC and/or load current varies. Because of this, in the case of operating incandescent lamp at an overvoltage as is the case of this invention, the load to the filament decreases to a minimum level, and this helps the incandescent lamp achieve a prescribed service life.

By the way, since in the rectifying and smoothing circuit 1 is used the smoothing capacitor C1 which usually has a relatively high capacitance, upon switch-on an inrush current because of its electrification may flow into the smoothing capacitor C1 and seriously damage the rectifying diodes D1–D4 and/or smoothing capacitor C1. In order to limit such an inrush current, for example, as shown in FIG. 1, one can provide an inrush current-limiting circuitry consisting of an inrush current-limiting resistor R1 connected between the rectifying diodes D1–D4 and smoothing capacitor C1, a thyristor Th having a main current path connected in parallel with the inrush current-limiting resistor R1, and a conduction-controlling circuit connected with the gate of the thyristor Th, whereby the smoothing capacitor C1 is gradually electrified through the inrush current-limiting resistor R1, and immediately after the electrification is almost completed, the conduction-controlling circuit triggers the thyristor Th to shunt the inrush current-limiting resistor R1.

In addition, since it is said that the filament at ambient temperature of incandescent lamp exhibits a resistance which is generally several one-tenth of that in incandescent state, any direct application of a dc voltage exceeding the rating has a fear of flowing into the filament a large inrush current which may shorten the service life of incandescent lamp. To prevent such an inrush current, one can provide a soft-start circuit which gradually increases the dc voltage to be supplied the incandescent lamp from a prescribed low level to a prescribed overvoltage level by gradually increasing the pulse width of the control voltage to be applied to the switching element 3 whenever, for example, incandescent lamp is exchanged with new one while leaving the power switch closed.

Such a soft-start circuit can be realized, for example, by using a switching regulator integrated circuit such as "μPC1094C (a product of NEC Corp., Tokyo, Japan)", "μPC1094G (a product of NEC Corp., Tokyo, Japan)", "MB3579 (a product of Fujitsu Ltd., Tokyo, Japan)" and "TL494 (a product of Texas Instruments Inc., Texas, USA)" to control the switching element 3, and allowing the integrated circuit to do a dead-time control in corporation with a delay circuit such as RC time constant circuit. Such a soft-start circuit has an additional effect to prevent damages of the switching element 3 by the initial electrification of the capacitor C2, as well as to prevent overshoot during the rise-up of output voltage.

In order to prevent the initial inrush current into filament and smoothing means, the arc discharge current by the burnout of filament and the damage of the switching element 3 by the overcurrent which originates from circuit runaway, one can provide in the current path including the main current path of the switching element 3, for example, both current-sensing means such as resistor and conventional overcurrent-protecting circuit which first senses the voltage across the current-sensing means to check the occurrence of overcurrent, then controls the conduction of the switching element 3.

Although in switching power supply circuitry the occurrence of overvoltage is less, one can further provide both voltage-sensing circuit in the aforementioned overcurrent-protecting circuit and overvoltage-protecting circuit, the latter of which either reduces the pulse width of the control voltage to be supplied to the switching element 3 or turns the pulse at the input terminal off to limit overvoltage if it occurs.

In this way, by operating incandescent lamp at a dc voltage exceeding its rating, desirably, in the range of about 105–135% thereof, one can obtain a light usually with a color temperature of about 2,900 K. or higher, desirably, in the range of about 2,950–3,100 K. and also with a spectral distribution closer to that of sunlight, in particular, morning sunlight, which is flickerless, natural, gentle to the eyes and favorably useful in illumination in general.

The service life of incandescent lamp in this instance is usually about 100 hours or longer, dependently on the applied voltage, type of filling gas, structure and shape, which would cause no serious problem when used in illumination in general. In case of using a soft-start circuit which energizes incandescent lamp with a gradually increasing dc voltage to limit switch-on inrush current, one can consistently obtain over a long time period, in particular, for about 150 hours or longer, desirably, about 200–2,000 hours, a light with a color temperature of about 2,900 K. or higher, desirably, in the range of about 2,950–3,100 K., which is flickerless, natural superior in color rendering properties and gentle to the eyes. Especially, when krypton or xenon lamp is operated at a dc voltage of about 105–135% of their rating, one can obtain a light with a color temperature of about 2,900 K. or higher, desirably, in the range of about 2,950–3,100 K. over a longer time period, usually, for about 400 hours or longer, desirably, about 500–2,000 hours.

In case of operating, for example, two incandescent lamps with one luminaire of this invention, no overcurrent occur and the circuitry never becomes unstable even when in operation either of the incandescent lamps is stopped or one suspended incandescent lamp is additionally turned on because the luminaire of this invention can keep the voltage to be supplied to the incandescent lamp(s) substantially constant. In this case, when a plurality of incandescent lamps are successively exchanged and operated at prescribed time intervals, one can obtain a much longer service life for each incandescent lamp than in the case of operating one incandescent lamp in continuous manner.

In addition, switching power supply circuitries even with a relatively large capacity, in particular, up to several hundred watts, can be made lighter and smaller, and used in foreign countries with different standard ac line without changing circuit constants because switching power supply circuitries adopt to a relatively wide range of input voltage.

Because of these, the luminaire of the present invention is advantageously usable as table and desk lightings, for example, adjustable lamp, desk lamp, hurricane lamp, table lamp and mini lamp; indoor and outdoor lightings, for example, ceiling fixture, down light, wall fixture, pendant, chandelier, swag lamp and floor lamp, garden lamp and porch for the illumination of study room, children's room, bed room, living room, dining room, kitchen, toilet room, washroom, bath room, passage, stairs, balcony and porch in detached house, apartment house and multiple house, as well as for the illumination of reading room, school room, hall, lobby, waiting room, treating room, control room, office room, drawing room, laboratory, lounge, guest room, clerk room, cooking room, operating room and cultivating room in facilities such as library, school, studio, beauty salon, hospital, factory, office, "ryokan (Japanese-style hotel)", hotel, restaurant, banquet hall, wedding hall, conference hall, store, shop, supermarket, department store, art museum, museum, concert hall, hall, airplane, vehicle, pool, gymnasium, sports ground, poultry farm, fish farm and plant factory.

One or more unitized luminaires of the present invention can be subjected to a lighting pattern control, time schedule control, daylight-interlocking control, wall switch control, centralized control and/or dimming control by appropriately locating the luminaire(s) in the above described house and facilities, and subjecting the luminaire(s) to a lighting control system using dimming and switching circuits, for example, wire control systems such as individual wiring system, personal wiring multiplex system, telephone line system, power line carrier system and optical fiber system and wireless control system such as electric wave control system, light control system, ultrasonic control system and acoustic control system. Particularly in household lighting, one or more luminaires of the present invention can be totally controlled together with other electric equipments by incorporating the luminaire(s) into a home bus system.

Since the light from the luminaire of the present invention is natural and closer to early morning sunlight and exhibits a remarkable effects in the prevention and treatment of diseases, for example, visual fatigue, pseudomyopia, asthenopia and depression, and also in the improvement of the growth and productivity of animals and plants, the luminaire can be advantageously used to practice physical therapy at home and infirmaries such as hospital and clinic, as well as an illuminant for farms and factories such as poultry farm, fish farm and plant factory.

The light obtained by operating incandescent lamp at a voltage exceeding its rating is rich in infrared component, in particularly, a far-red component with a wavelength of 25–1,000 microns. The far-red component has an activity of accelerating the perspiration, oxygen intake and blood circulation in animals to promote or improve their metabolism, lowering of blood pressure and blood sugar, excretion of metabolic products, relieving of obesity and rehabilitation, as well as having an activity of relieving inflammatory pains and spasms.

Because of these, the luminaire of the present invention exhibits remarkable effects in the relaxation of myonic tonus by stiff shoulder and myalgia; in the relieving of spasms and dorsal pains by trauma, burn, rheumatism, arthritis, lambago, neuralgia, extermal otitis, tymanitis, nasosinusitis, tonsillitis, pharyngitis, laryngitis, throaty voice and visceral diseases; and in the prevention and treatment of geriatric diseases such as cancer, hepatitis and hepatocirrhosis when equipped with an incandescent lamp using a lead-free or low lead content glass bulb for a higher infrared transmission. Such a luminaire can be advantageously used to practice physical therapy at home and infirmaries such as hospital and clinic.

Since infrared component-rich light exhibits a remarkable germicidal activity on microorganisms and accelerates the growth of plants, the luminaire of the present invention can be also advantageously used as germicidal lamp, as well as illuminant for cultivating rooms such as plant factory.

Although several types of switching power supply circuitries have been hitherto known, there has been no instance of luminaire wherein switching power supply circuitry is used to take out from an ac source with a relatively high voltage, for example, standard ac line, a dc voltage exceeding the effective voltage of the ac source, and stabilizes and applies the dc voltage to incandescent lamp for its operation.

The present invention will be explained hereinafter with illustrated embodiments using chopper-type switching power supply circuitries. The embodiments are of course only illustrative, and the present invention should not be restricted thereto.

Figure 2:
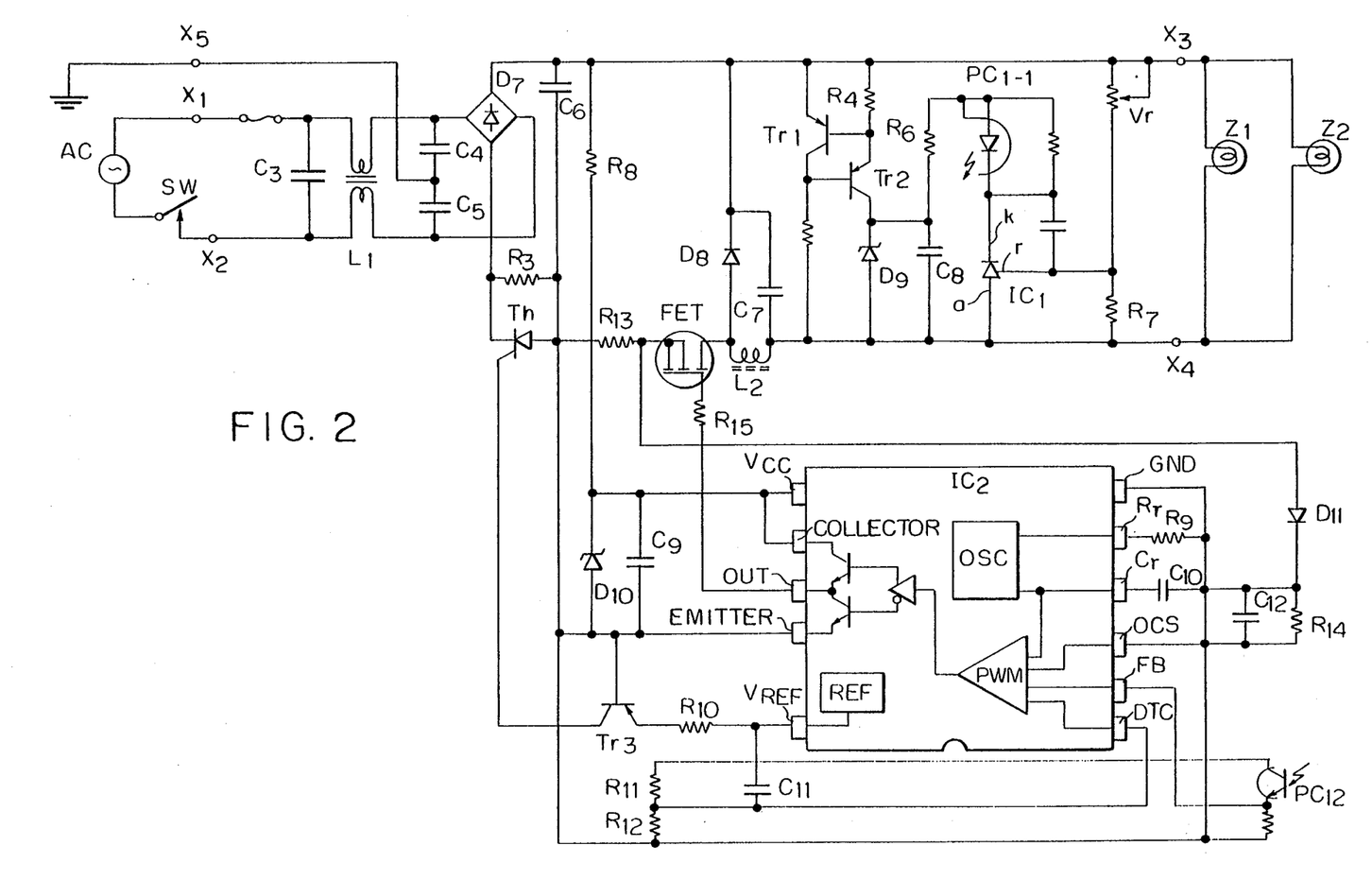
FIG. 2 is a circuit of an embodiment according to the present invention.

FIG. 2 shows an electric circuit of an embodiment according to the present invention using a chopper-type switching power supply circuitry.

In the figure, AC designates standard ac line as ac source, and the ac power source AC is connected with the input terminal of a bridge diode D7 through input terminals X1, X2, a power switch SW and an inductor L1. Both terminals of the inductor L1 are connected with capacitors C3, C4 and C5 which form a line filter together with the inductor L1. The capacitors C4 and C5 are grounded through an earth terminal X5.

The output terminal of the bridge diode D7 is connected with a smoothing capacitor C6 through an inrush current-limiting resistor R3, and the main current path of a thyristor Th is connected in parallel with the inrush current-limiting resistor R3.

The smoothing capacitor C6 is connected with the source of a power MOS field-effect transistor FET as switching element, and the drain is connected with a smoothing circuit consisting of a flywheel diode D8, a high-frequency inductor L2 and a capacitor C7.

The output terminal of the smoothing circuit is provided with a current-regulating circuit consisting of transistors Tr1, Tr2, resistors R4 and R5, and the collector of the transistor Tr2 is connected with a voltage-regulating diode D9 and a capacitor C8 for voltage stabilization. The voltage across the voltage-regulating diode D9 and capacitor C8 is supplied to the cathode of an integrated circuit IC1 through a resistor R6 and the light-emitting section PC1-1 of a photo-coupler. The integrated circuit IC1 is a shunt regulator integrated circuit and chosen, for example, from "μPC1093 (a product of NEC Corp., Tokyo, Japan)" and "TL431 (a product of Texas Instrument Inc., Texas, USA)". Output terminals X4 and X5 of the switching power supply circuitry are connected with an output voltage-sensing circuit consisting of a variable resistor Vr and a resistor R7 as well as with incandescent lamps Z1, Z2, and the resistor R7 is connected with the reference terminal "r" of the shunt regulator integrated circuit IC1. These shunt regulator integrated circuit IC1 and output voltage-sensing circuit are arranged to form a voltage comparator circuit, which compares the output voltage of the switching power supply circuitry with a standard voltage and then flows a current into the light-emitting section PC1-1 of the photocoupler to allow it to generate emission if the output voltage is higher than the standard voltage. Thus, an error signal is supplied to the integrated circuit IC2.

The integrated circuit IC2 is a switching regulator integrated circuit, for example, "$\mu$PC1094C (a product of NEC Corp., Tokyo, Japan)", "$\mu$PC1094G (a product of NEC Corp., Tokyo, Japan)", "$\mu$PC494 (a product of NEC Corp., Tokyo, Japan)", "TL494 (a product of Texas Instruments Inc., Texas, USA)" and "MB3579 (a product of Fujitsu Ltd., Tokyo, Japan)", which controls the filed-effect transistor FET in on/off manner based on such an error signal and usually encloses an oscillator circuit OSC, a standard voltage-generating circuit REF, a pulse-width modulating circuit PWM and an output circuit.

In this case, among the control circuits contained in the switching power supply circuitry, the main control circuitry excluding, for example, the switching element, thyristor, inrush current-limiting resistor and output voltage-sensing circuit can be prepared into an integrated circuit or a hybrid integrated circuit. This is very favorable in both the size- and cost- of the switching power supply circuitry. For example, when the shunt regulator integrated circuit IC1, light-emitting and light-receiving sections PC1-1 and PC1-2 of the photocoupler, switching regulator integrated circuit IC2 and, if necessary, their relating circuit elements which should generate in use a less heat and be connected to the integrated circuits and photocoupler with the possible shortest wiring are prepared into a hybrid integrated circuit, one can prepare at a lower cost a smaller switching power supply circuitry with a consistently higher performance and quality. Such a hybrid integrated circuit can be made, for example, by arranging and connecting conventional shunt regulator IC tip, photocoupler, switching regulator IC tip and, if necessary, their relating circuit elements on a basal plate of appropriate material, shape and size, and wholly mould-packaging these elements and basal plate.

Now taking "$\mu$PC1094C" for example for the following explanation, the power supply pin Vcc is connected with the positive electrode of the smoothing capacitor C6 through a resistor R8, and the voltage across the smoothing capacitor C6 is dropped by this resistor R8, stabilized by a voltage-regulating diode D10 and a capacitor C9, and supplied to the switching regulator integrated circuit IC2. Thus, since upon switch-on the voltage across the capacitor C9, in other words, that at the power supply pin Vcc gradually increases as the voltage across the smoothing capacitor C6 increases, the switching regulator integrated circuit IC2 is set such that it starts when the power source voltage reaches a prescribed magnitude, for example, 10 V or higher for "$\mu$PC1094C", while at a lower magnitude the integrated circuit IC2 stands by.

The oscillator circuit OSC is to generate sawtooth wave, and its oscillation frequency is determined by the external capacitor C10 connected between a pin CT and a ground pin GND and the external resistor R9 connected between a pin RT and the ground pin GND. The pin CT is connected with the pulse-width modulating circuit PWM within the integrated circuit IC2 such that the generated sawtooth wave is supplied to the pulse-width modulating circuit PWM.

The standard voltage-generating circuit REF starts to generate the standard voltage immediately after the power supply voltage reaches or exceeds a prescribed magnitude, and the output is supplied to a standard voltage pin VREF. The generated standard voltage is applied to the gate of the thyristor Th through a resistor R10 and the main current path of a high-power transistor Tr3 to trigger the thyristor Th and shunt the inrush current-limiting resistor R3.

The pulse-width modulating circuit PWM is to control the field-effect transistor FET in on/off manner based on the error signal from the shunt regulator integrated circuit IC1, and bears several terminal pins including a feedback control pin FB, a dead-time control pin DTC and an overcurrent-sensing pin OCS. Among these, the feedback control pin FB is connected with the light-receiving section PC1-2 of the photocoupler so that the aforementioned error signal is applied in insulating manner. Between the dead-time control pin DTC and standard voltage pin VREF is connected an integrating circuit consisting of resistors R11, R12 and a capacitor C11 such that the integrating circuit energizes the dead-time control pin DTC with a gradually decreasing voltage immediately after the standard voltage-generating circuit REF starts. Since the pulse-width modulating circuit PWM is arranged such that it makes the pulse width narrower if the voltage at the dead-time control pin DTC is high, the pulse width gradually widens as the voltage from the integrating circuit gradually decreases, thus the output voltage of the switching power supply circuitry gradually increases.

The overcurrent-sensing pin OCS is connected through a diode D11 to a resistor R13 as current-sensing means inserted in the main current path of the field-effect transistor FET, and the voltage across the resistor R13 is rectified and smoothed by the diode D11, a resistor R14 and a capacitor C12, and then supplied to the overcurrent-sensing pin OCS. The pulse-width modulating circuit PWM narrows the pulse width of the control signal to be supplied to the field-effect transistor FET if the voltage across the resistor R13 exceeds a prescribed magnitude. In other words, the pulse-width modulating circuit PWM is arranged such that it first compares the applied sawtooth wave with each voltage at the feedback control pin FB, overcurrent-sensing pin OCS and dead-time control pin DTC, then controls the pulse width based on the highest voltage using the OR logic gate. Thus, the output voltage is first allowed to rise up in soft-start manner, then stabilized to a prescribed constant magnitude whenever there is found no abnormality in output current.

A collector pin COLLECTOR and an emitter pin EMITTER both in the output circuit are connected with the power supply pin Vcc and ground pin GND respectively, and the control signal from the pulse-width modulating circuit PWM is first amplified by this output circuit, then supplied to the gate of the field-effect transistor FET through an output pin OUT and a resistor R15.

Now explaining the operation of this embodiment, immediately after switch-on, the input terminal of the bridge diode D7 is energized with the ac voltage from the ac power source AC. Since at this time the thyristor Th is not in conduction and the rectified output of the bridge diode D7 gradually electrifies the smoothing capacitor C6, no switch-on inrush current occurs even when a capacitor with a relatively high capacity is used for the smoothing capacitor C6.

As the electrification of the smoothing capacitor proceeds, the voltage across the capacitor C9 gradually elevates. Immediately after the voltage reaches a prescribed magnitude, the standard voltage-generating circuit REF starts and applies a trigger voltage to the gate of the thyristor Th through the resistor R10 and transistor Tr3, thus the thyristor Th is conducted to shunt the inrush current-limiting resistor R3. Since at this time the electrification of the smoothing capacitor C6 has been almost completed, no inrush current by electrification occurs when the full rectified output of the bridge diode D7 is applied to the smoothing capacitor C6.

Since immediately after the standard voltage-generating circuit REF starts, the dead-time control pin DTC in the pulse-width modulating circuit PWM receives a gradually increasing voltage, the pulse width of the control signal to be supplied to the gate of the field-effect transistor FET widens and the voltage across the incandescent lamps Z1, Z2 increases both with the passage of time. Thus, by setting the time constant of the integrating circuit, consisting of resistors R11, R12 and capacitor C11, to a level long enough to preheat the filaments of the incandescent lamps Z1, Z2, the shortening of their service life by inrush current can be effectively prevented.

Immediately after switch-on of the field-effect transistor FET, an integrating current flows into the incandescent lamps Z1, Z2 and high-frequency inductor L2 to electrify the capacitor C7. Subsequent switch-off of the field-effect transistor FET permits the current stored in the high-frequency inductor L2 to release through the flywheel diode D8. The repetition of such an on/off operation generates a voltage at the output terminal of the smoothing circuit consisting of the high-frequency inductor L2, flywheel diode D8 and capacitor C7, and the voltage energizes the current-regulating circuit consisting of transistors Tr1, Tr2, resistor R4 and R5, thus the shunt regulator integrated circuit IC1 being allowed to come into operation. Thereafter, the voltage divided by the variable resistor Vr and resistor R7 is compared with the standard voltage, and the pulse width of the control signal to be supplied to the field-effect transistor FET is made narrower if the output voltage is higher than the standard voltage, while on the contrary if the output voltage is lower than the standard voltage, the pulse width is made wider. In this way, the dc voltage at the output terminal is stabilized to a prescribed constant magnitude.

If in use a certain factor causes overcurrent in the current path including the incandescent lamps Z1, Z2, an unusual voltage is sensed across the current-sensing resistor R13 and the switching regulator integrated circuit IC2 controls with the sensed voltage the pulse width of the control signal to be supplied to the gate of the field-effect transistor FET to limit the overcurrent.

In this embodiment, now designating the input voltage for the field-effect transistor FET and the dc voltage to be supplied to the incandescent lamps Z1, Z2 as "Ei" and "Eos" respectively, and further designating the averaged Ei as "Eiav", the switching power supply circuitry of this embodiment suspends on/off operation in case of Ei<Eos and comes into analog mode, while in case of Eiav>Eos the circuitry transfers to switching mode. In intermediate case, in particular, when Eiav is approximately equal to Eos, the switching power supply circuitry comes into continual switching mode. For example, when Eos is set to about 116 V and one or more 60 W incandescent lamps, rated voltage of 100 V, are loaded, then the switching power supply circuitry achieves a very high and approximately consistent power efficiency, in particular, about 94%, notwithstanding the number of the incandescent lamp(s) in operation.

Unlike the forward converter-type switching power supply circuitry as shown in FIG. 1, this embodiment does not require inverter transformers which usually reduce power efficiency and/or need special housing space, and this facilitates the size- and weight-down of the switching power supply circuitry.

Further, in this embodiment a current-regulating circuit comprising transistors Tr1, Tr2 is provided at the output terminal of the rectifier circuit and arranged such that a constant bias voltage is consistently supplied to the shunt regulator integrated circuit IC1 from switch-on till the switching power supply circuitry comes into stationery state. Because of this, one can continuously and smoothly change for lamp dimming the voltage Eos over a wide range, in particular, in the range of about 10–116 V, in other words, about 9–100% of the full output voltage only by operating the variable resistor Vr.

In addition, this embodiment can be prepared, for example, into unit wherein a semi-fixed variable resistor is enclosed and set such that the incandescent lamps Z1, Z2 receive a constant dc voltage; wherein a variable resistor Vr is externally provided such that the dc voltage to be supplied to the incandescent lamps Z1, Z2 can be continuously changed by suitably operating the variable resistor; or wherein internal and external variable resistors are arranged such that they are freely interchangeable with switching means.

Figure 3:
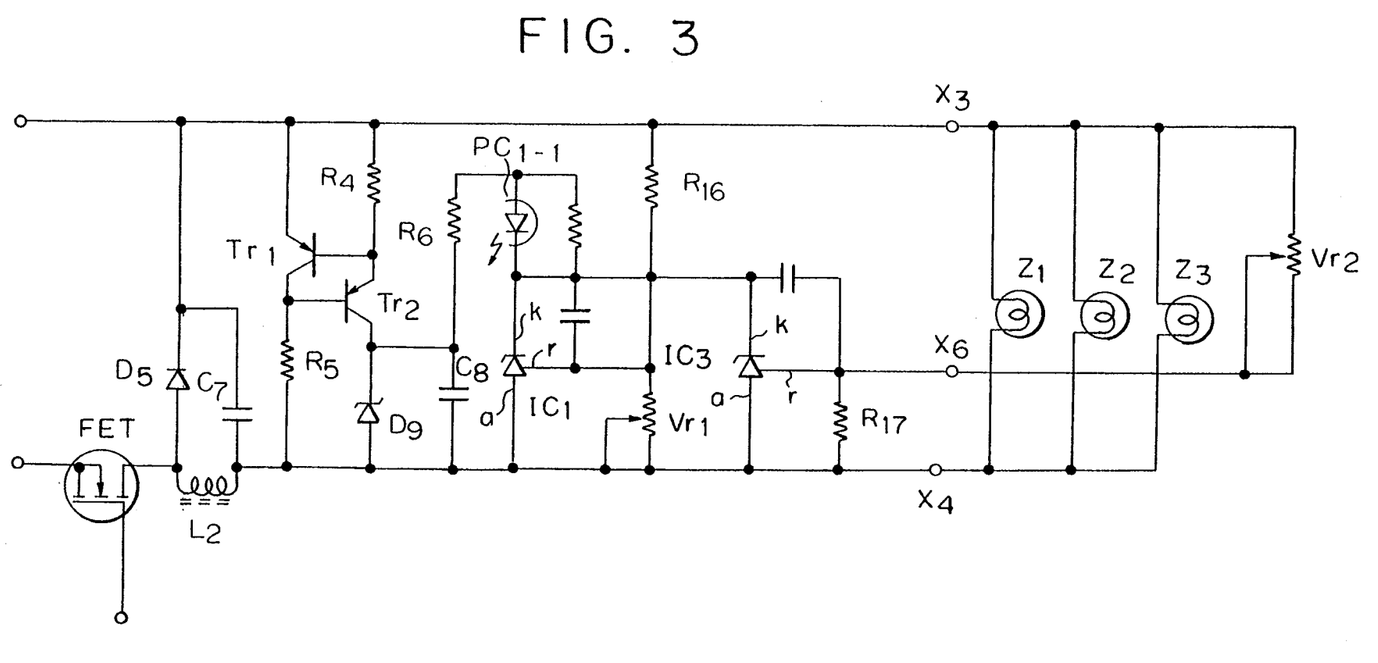
FIG. 3 is a circuit of another embodiment according to the present invention wherein dimming means is externally attachable.

In particular, by employing, for example, the following arrangement, one can achieve lamp dimming only by suitably providing an external variable resistor Vr2 outside the unit, and operating the variable resistor Vr2 to change the dc voltage to be supplied to the incandescent lamps Z1, Z2, Z3: As shown in FIG. 3, a first circuitry consisting of a shunt regulator integrated circuit IC1 and an output voltage-sensing circuit consisting of a resistor R16 and a variable resistor Vr1 and a second circuitry consisting of another shunt regulator integrated circuit IC3 and another output voltage-sensing circuit consisting of a variable resistor Vr2 and a resistor R17 are connected in parallel each other to output terminals X3, X4 of a switching power supply circuitry unit. The variable resistor Vr2 in the latter output voltage-sensing circuit is removably attached outside the unit, and the circuit constants in both output voltage-sensing circuits are set such that when the variable resistor Vr2 is in connection, only the shunt regulator integrated circuit IC3 is on, while, when the variable resistor Vr2 is removed, only the shunt regulator integrated circuit IC1 is on.

By the way, since dependently on the operating power and time, when a plurality of incandescent lamps, usually, three or more incandescent lamps are operated with a switching power supply circuitry as shown in FIGS. 1 and 2, the heat generation by the bridge diode becomes remarkably large and this makes it inevitable to use heat sinks and/or bridge diodes with an unnecessarily large size or capacity. At the same time, the use of this arrangement results in the problem that the voltage drop across the bridge diode and that across the main current path of the thyristor Th are added in series manner and this hinders the obtainment of an increased maximum output voltage from the switching power supply circuitry.

Figure 4:
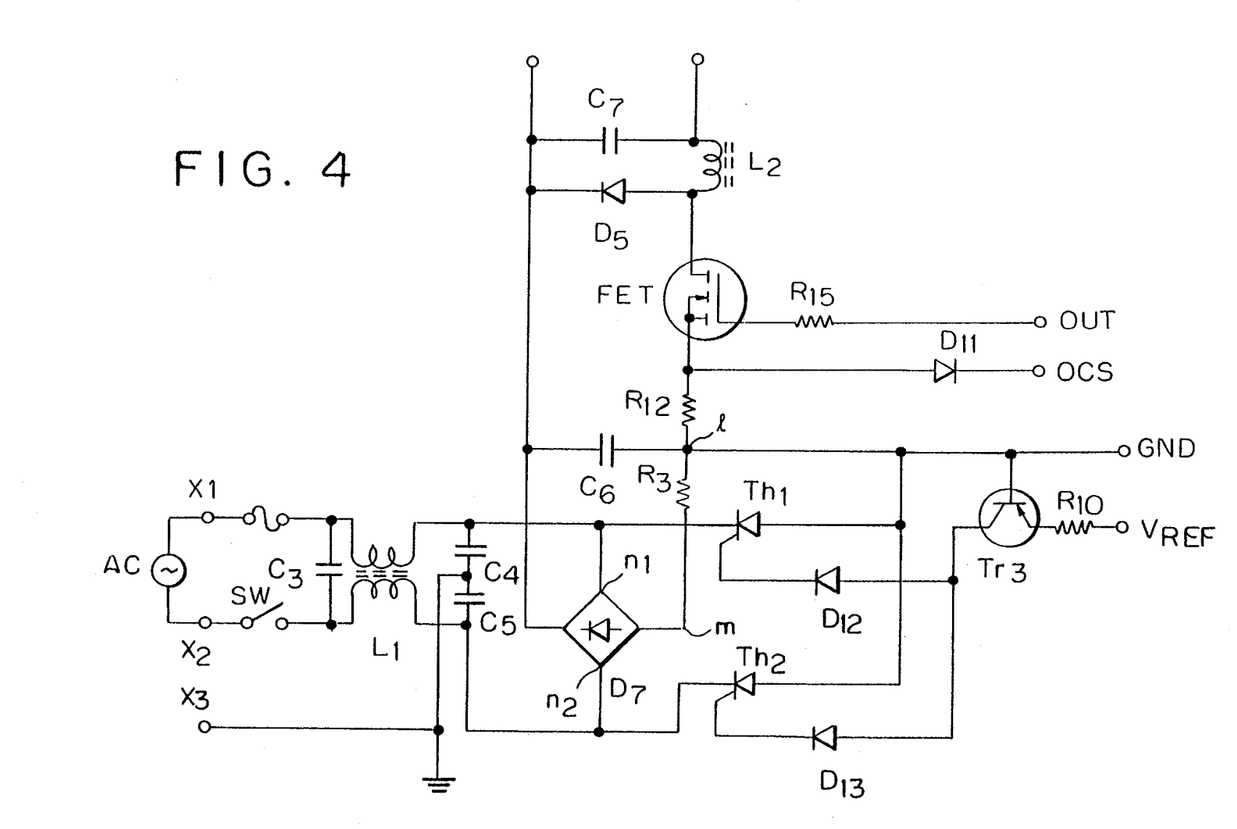
FIG. 4 is a circuit of a rectifying circuit feasible in the present invention.

FIG. 4 shows an example of rectifying circuit for switching power supply circuitry which hardly causes such a problem.

In this embodiment, to shunt an inrush current-limiting resistor R3, a pair of thyristors Th1, Th2 are used. Their main current paths are not connected in parallel to both terminals "1", "m" of the inrush current-limiting resistor R3, but connected in parallel between the terminal "1" at the load side of the inrush current-limiting resistor R3 and the terminals "n1", "n2" at the ac side of the bridge diode D7.

Because of this arrangement, immediately after the pair of thyristors Th1, Th2 come into conduction, their main current paths are allowed to bypass both inrush current-limiting resistor R3 and diode elements in the returning circuit of the bridge diode D7. Thus, a part of the current which inherently flows through the bridge diode D7 is bypassed to the main current paths of the thyristors Th1, Th2, and this reduces the heat generation by the bridge diode D7 and eliminates needs for bridge diodes with an unnecessary large capacity for the bridge diode D7, as well as for heat sinks with an unnecessary large size.

Since in this case the main current paths of the thyristors Th1, Th2 are in parallel connection with the diode elements in the returning circuit of the bridge diode D7, the voltage drop across the bridge diode D7 and those across the thyristors Th1, Th2 arise in part in parallel manner but does not arise in series manner as in the case of the rectifying and smoothing circuit in FIGS. 1 and 2. Thus, this embodiment has the advantage that it increases the maximum output voltage of switching power supply circuitries.

The light from this embodiment has a color temperature usually of about 2,900 K. or higher, desirably, in the range of about 2,950–3,100 K., as well as being flickerless, natural, superior in color rendering properties and gentle to the eyes, and these render the embodiment useful in various luminaires using one or more incandescent lamps.

The switching power supply circuit in this embodiment can be advantageously used in other electric equipments needing a relatively high stabilized dc voltage, for example, vacuum cleaners, ventilating fans, air conditioners and electric fans, as well as in luminaires.

As described heretofore, since in the present invention incandescent lamps are operated at a voltage exceeding their rating, one can obtain over a long time period a light with a color temperature of about 2,900 K. or higher, desirably, in the range of about 2,950–3,100 K., which is flickerless, natural, superior in color rendering properties, gentle to the eyes, therefore very useful in illumination.

Further, since the present invention uses switching power supply circuit, it has the futures that:

(i) the power supply can be easily made smaller because its power efficiency is high;

(ii) two or more incandescent lamps can be easily operated with one power supply circuitry;

(iii) the output voltage can be kept constant even when the input voltage and/or load current varies because the voltage regulation is easily achieved;

(iv) the shortening in service life of incandescent lamp and damage of circuit elements can be effectively prevented because soft-start function can be easily imparted;

(v) lamp dimming can be easily achieved by continuously or stepwisely changing the output voltage; and (vi) the power efficiency does not greatly vary even when the load power changes.

Accordingly, the luminaire of the present invention can be advantageously used in the illumination of various houses and facilities such as library, school, studio, beauty salon, hospital, factory, office, "rhyokan", hotel, restaurant, banquet hall, wedding hall, conference hall, store, shop, supermarket, department store, art museum, museum, concert hall, hall, airplane, vehicle, swimming pool, gymnasium, poultry farm, fish farm and plant factory.

Further, since the light from the luminaire of this invention is natural, closer to morning sunlight and very effective in the prevention and treatment of diseases, for example, visual fatigue, pseudomyoxia, asthenopis and depression, and also in the improvement of growth and productivity of animals and plants, the luminaire can be advantageously used as a physical therapeutic tool at home and infirmaries such as hospital and clinic, as well as an illuminant for farms and factories such as poultry farm, fish far and plant factory.

The present invention by attaining such effects would greatly contribute to the art.

We claim:

1. A luminaire using at least one incandescent lamp as a luminous source, which comprises a switching power supply circuit capable of supplying from an ac source to said incandescent lamp a direct current(dc) voltage of about 105–130% of the rating of said lamp so that said incandescent lamp is energized with said dc voltage to emit a light with a color temperature of about 2,900 K. or higher.

2. The luminaire of claim 1, wherein in operation the total luminous flux of said incandescent lamp is about 900 lumen or higher.

3. The luminaire of claim 1, wherein said incandescent lamp is a krypton lamp, argon lamp or xenon lamp.

4. The luminaire of claim 1, wherein said switching power supply circuit comprises:

a first rectifying and smoothing circuit to convert ac into dc;

a switching element capable of repeating on/off operation at high speed, said switching element having a main current path connected with an output terminal of said first rectifying and smoothing circuit;

a second rectifying circuit to convert a high-frequency output voltage from said switching element, said second rectifying circuit being connected with a main current path of said switching element;

a feedback amplifying circuit to compare an output voltage of said second rectifying circuit with a standard voltage, said feedback amplifying circuit being connected with said second rectifying circuit; and a pulse-width modulating circuit to modulate a control signal from said feedback amplifying circuit and also to control said switching element in on/off manner.

5. The luminaire of claim 1, wherein said switching power supply circuit is provided with an inrush current-limiting circuit which comprises:
- an inrush current-limiting resistor to prevent an inrush current which electrifies a smoothing means;
- a thyristor having a main current path connected in parallel with said inrush current-limiting resistor; and
- a conduction-controlling circuit to trigger said thyristor when the electrification of said smoothing means is almost completed, said conduction-controlling circuit being connected with a gate of said thyristor.

6. The luminaire of claim 1, wherein said switching power supply circuit is provided with an output voltage-sensing circuit to sense a voltage across said incandescent lamp, said output voltage-sensing circuit comprising a variable resistor and a resistor, whereby the dc voltage to be applied to said incandescent lamp is controlled with said variable resistor for lamp dimming.

7. The luminaire of claim 1, wherein said switching power supply circuit is provided with a soft-start circuit comprising an RC time constant circuit, said soft-start circuit being capable of gradually increasing the dc voltage to be applied to said incandescent lamp.

8. The luminaire of claim 1, wherein said switching power supply circuit is of chopper type.

9. The luminaire of claim 4, wherein at least the feedback amplifying circuit and pulse-width modulating circuit are in an integrated circuit or hybrid integrated circuit.

10. A luminaire using at least one incandescent lamp as a luminous source, which comprises switching power supply circuit means for supplying from an ac source to said incandescent lamp a constant direct current (dc) voltage of about 105–135% of the rating of said lamp even when the voltage of said ac source and the load current of said incandescent lamp vary, so that said incandescent lamp is energized with said constant dc voltage to emit a light with a color temperature of about 2,900 K. or higher.

* * * * *